(12) United States Patent
Smith et al.

(10) Patent No.: US 8,830,806 B2
(45) Date of Patent: *Sep. 9, 2014

(54) OPTICAL DISC WITH A THEFT DETERRENT COATING

(75) Inventors: Wayne M. Smith, La Cañada, CA (US); Christopher J. Cookson, Studio City, CA (US); Lewis S. Ostrover, Los Angeles, CA (US); Alan E. Bell, San Marino, CA (US)

(73) Assignee: Warner Bros. Entertainment Inc., Burbank, CA (US)

( * ) Notice: Subject to any disclaimer, the term of this patent is extended or adjusted under 35 U.S.C. 154(b) by 1073 days.

This patent is subject to a terminal disclaimer.

(21) Appl. No.: 12/174,841

(22) Filed: Jul. 17, 2008

(65) Prior Publication Data
US 2009/0010127 A1    Jan. 8, 2009

Related U.S. Application Data

(62) Division of application No. 11/398,062, filed on Apr. 5, 2006, now Pat. No. 7,417,713.

(60) Provisional application No. 60/668,690, filed on Apr. 6, 2005.

(51) Int. Cl.
*G06F 21/00* (2013.01)
*G11B 7/24* (2013.01)
*G11B 23/28* (2006.01)
*G11B 20/00* (2006.01)

(52) U.S. Cl.
CPC ........... *G11B 7/24* (2013.01); *G11B 23/282* (2013.01); *G11B 23/286* (2013.01); *G11B 20/00086* (2013.01); *G11B 20/00876* (2013.01); *G11B 20/00608* (2013.01)
USPC ...................................... 369/53.21

(58) Field of Classification Search
USPC .............................. 726/35; 369/53.21, 21, 53
See application file for complete search history.

(56) References Cited

U.S. PATENT DOCUMENTS 3,073,955 A    1/1963 Hale
3,595,655 A    7/1971 Robinson et al.
(Continued)

FOREIGN PATENT DOCUMENTS

EP    1416294 A1    9/2008
WO    00/79228 A1    12/2000
WO    02/075733 A1    9/2002

OTHER PUBLICATIONS

Cronin, et al., Electrochromic Glazing, Materials Research, vol. 2, No. 1, 1-9, 1999.
(Continued)

*Primary Examiner* — Pramila Parthasarathy
*Assistant Examiner* — Dao Ho
(74) *Attorney, Agent, or Firm* — Gottlieb, Rackman & Reisman, P.C.

(57) ABSTRACT

An optical disc used for storing content includes a theft control area selected to render the disc unreadable. The disc must be exposed to radiation of a specific wavelength before it can be read by a regular device. The theft control area may include an area that contains data that instructs the device not to read the disc. This area includes a coating that changes its optical characteristics when exposed to the radiation. The material could be radiochromic or thermochromic. Alternatively, the theft control area includes an RFID device that includes an element that is radiation sensitive. In this embodiment, when the disc is irradiated, the element changes its electrical characteristics.

22 Claims, 3 Drawing Sheets

(56) References Cited

U.S. PATENT DOCUMENTS

| | | |
|---|---|---|
| 4,918,317 A | 4/1990 | Hess et al. |
| 5,253,275 A | 10/1993 | Yurt et al. |
| 5,315,448 A | 5/1994 | Ryan |
| 6,232,610 B1* | 5/2001 | Pageau et al. ............... 250/474.1 |
| 6,733,950 B2 | 5/2004 | Breitung et al. |
| 7,008,456 B1* | 3/2006 | Tanaka et al. .................... 726/35 |
| 7,786,861 B2* | 8/2010 | Howarth et al. ........... 340/568.1 |
| 2003/0234190 A1 | 12/2003 | Kuo |
| 2004/0012496 A1* | 1/2004 | De Souza et al. .......... 340/572.3 |
| 2004/0054594 A1* | 3/2004 | Forster et al. ................... 705/18 |
| 2005/0083181 A1* | 4/2005 | Jalkanen et al. ........... 340/10.34 |
| 2005/0083829 A1* | 4/2005 | Selinfreund et al. ....... 369/272.1 |

OTHER PUBLICATIONS

Beshir et al., "Eosin Dyed Poly (Vinyl Butyral) Films for High-Does Radiation Dosimetry," Int'l Journal of Polymeric Materials, vol. 52, No. 6, pp. 485-498, Jun. 2003.

Abdel-Fattah et al., "Thin Film Dosimeters Based on Rose Bengal Dyed Poly (Vinyl Alcohol)," Int'l Journal of Polymeric Materials, vol. 51, No. 5, pp. 413-427, May 2002.

* cited by examiner

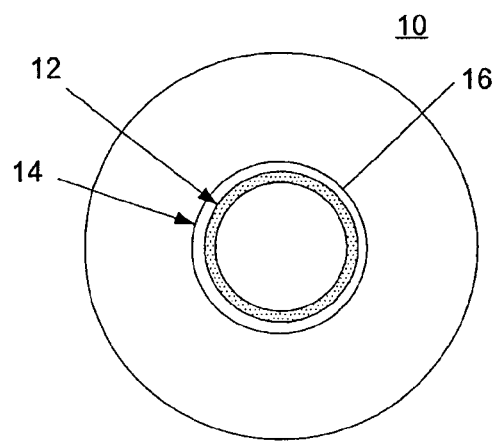
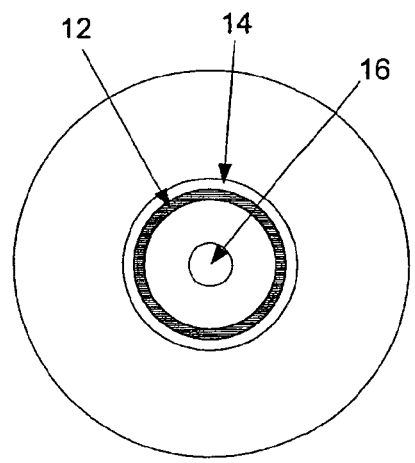
FIG. 1A
FIG. 1B
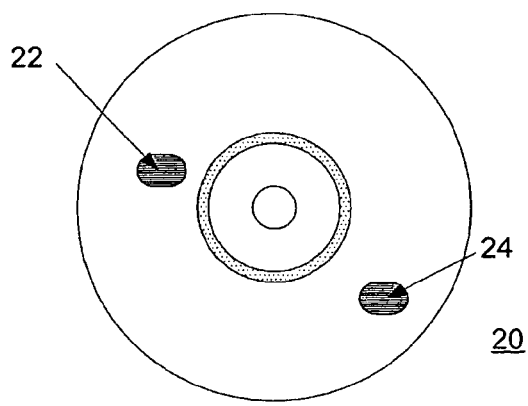
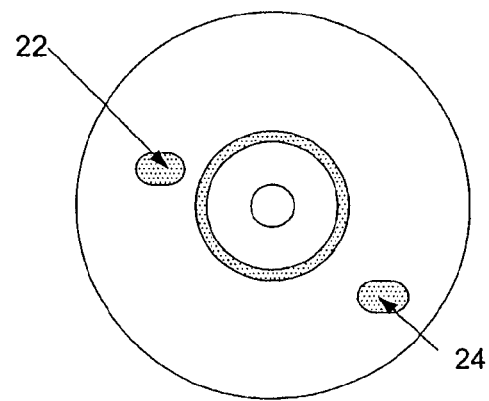
FIG. 2A
FIG. 2B

Fig. 3 A
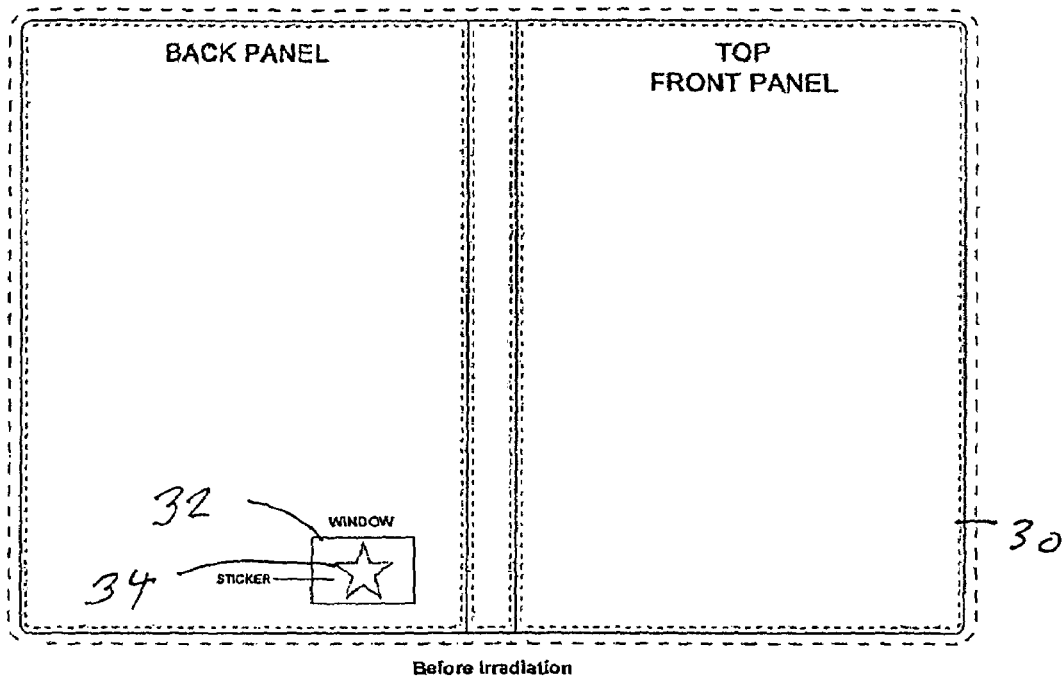
Before Irradiation
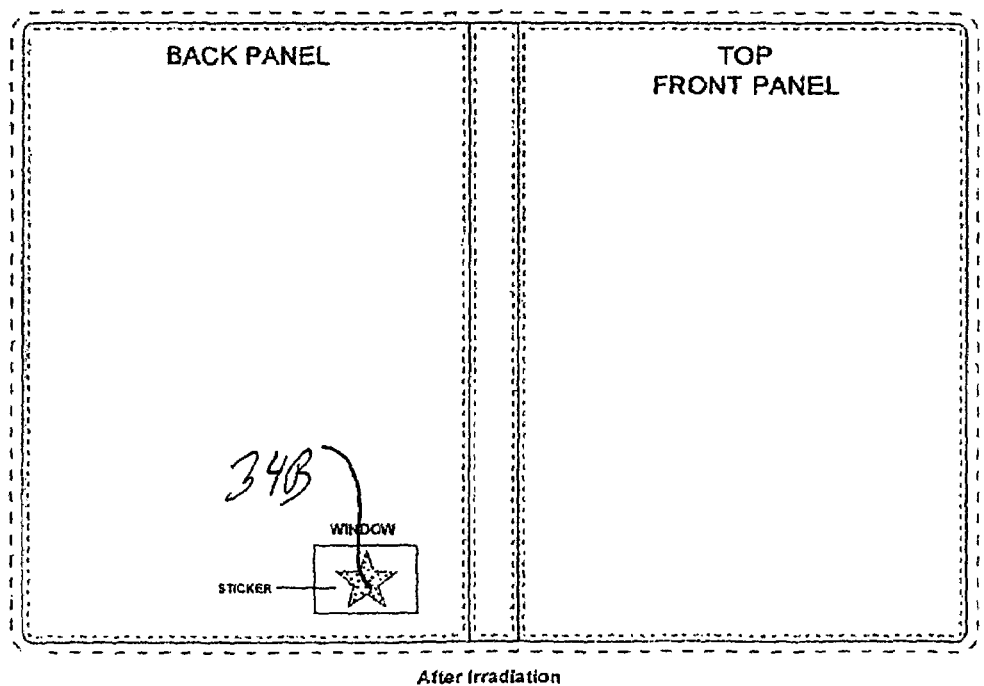
After Irradiation
FIG. 3B

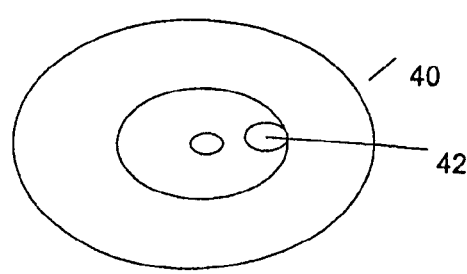
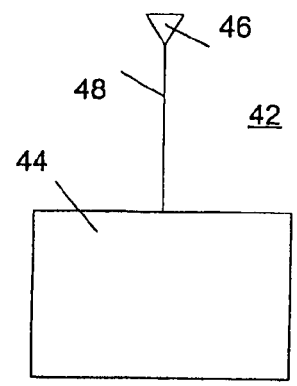
FIG. 4A
FIG. 4B
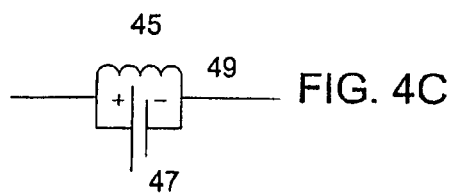
FIG. 4C
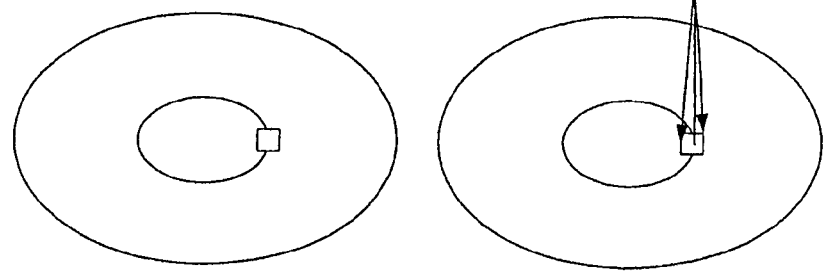
FIG. 5

OPTICAL DISC WITH A THEFT DETERRENT COATING

RELATED APPLICATION

This application is a Division of U.S. Ser. No. 11/398,062 filed Apr. 5, 2006, now U.S. Pat. No. 7,417,713, which claims priority to U.S. Provisional Application Ser. No. 60/668,690 filed on Apr. 6, 2005, the contents of which are incorporated herein by reference.

BACKGROUND OF THE INVENTION

A. Field of Invention

This invention pertains to an optical disc, such as CD, a DVD, and the like, that is partially coated with a material having characteristics that are changed when the material is subjected to radiation of a particular frequency, and this change either activates the optical disc so that it can be used in a device, or is disabled so that it cannot be used.

B. Description of the Prior Art

The theft of DVDs, computer and platform games, software, music CDs and other media on optical discs is a growing problem for retailers. Although it is possible to place theft deterrent devices in optical disc packaging, such devices are often unsuccessful in deterring theft. Such devices, which are typically triggered when the consumer exits the store, can be easily overcome by simply removing the optical disc from the package and concealing it on one's person before exiting the store.

Typically, theft of DVDs and other optical disc products housed in the commonly used "clam shell" case is accomplished by cutting the packaging material at the vertical edge of the case where it opens, applying pressure on the top and bottom of the case so that the cut opening expands, and removing the disc. The disc can be removed by either shaking it loose from the center spindle and sliding it out of the opening, or by physically removing it from the spindle by inserting a finger or other device into the opening of the case and applying pressure to the disc so that it is detached from the spindle and can then be easily removed from the case. Theft also occurs by simply opening the case in its entirely and removing the disc in usual fashion. Once the disc, which is smaller than the case, is removed therefrom, it can be easily concealed on one's person—in a pocket or purse—and surreptitiously removed from the retailer's environs. Although various improvements have been made to DVD cases to frustrate the removal of discs in the retail environment, such as by the addition of improved spindles and locking tabs, these approaches have not been fully effective in discouraging theft.

Theft of optical discs containing motion pictures, software and computer games is a significant problem for retailers. DVD discs containing motion pictures typically retail for $20.00 or more; computer and platform games often retail for $50.00 and some software sells for even more. Theft of these products, which are expensive relative to their small size, is a growing problem for retailers; particularly as such items tend to be highly profitable for retailers.

Theft of optical disc in the packaging is also a problem. Some retailers may not be able to afford expensive equipment that detects devices in packaging which, if not disabled, will cause an alarm to be activated when the customer leaves the store, or such devices may be removed from the packaging or the DVD by the customer while inside the store. Thus, certain solutions that to the theft problem such as engineering a theft-proof optical disc container, as disclosed, for example, in U.S. Patent Publication 20030234190 (application Ser. No. 10/178,465), do not provide complete solutions as the container itself with the enclosed disc may be removed from the retail environment without detection. Other approaches that are designed to render a disc unplayable employ oxygen penetrable substrates whereby the data layer corrodes and loses reflectivity upon exposure to air, such as that described in PCT Patent Publication no. 02075733 (application no. PCT/US02/05050) and U.S. Pat. No. 6,733,950. Such approaches, however, are not reversible and cannot be readily employed to fashion a theft deterrent system.

SUMMARY OF THE INVENTION

Briefly, an optical disc for storing digital content includes a hub, a lead-in area, a standard data storage area and a theft control area. The theft control area optionally includes data used for selectively enabling or disabling the playing or recording of the disc in a respective device.

In one embodiment of the invention, the theft control area is coated with a material that chances its optical characteristics when exposed to radiation of a specific wavelength. A material of this type is a radiochromic material. For example, the material may be originally transparent but becomes opaque or absorbent after exposure to radiation. Alternatively, the material may be originally opaque or absorbent but then becomes transparent after radiation. Preferably, the material changes its characteristics permanently after irradiation.

The theft control area may be in either the lead-in area of the disc or in the standard data storage area of the disc.

In another embodiment, the theft control area includes an RFID device that includes an element made of a radiation sensitive material. This element then changes its electrical characteristics when exposed to radiation of a specific wavelength. The element in turn is then used to selectively enable or disable the RFID device.

BRIEF DESCRIPTION OF THE DRAWINGS

FIGS. 1A and 1B show a disc with a coated lead-in area before and after irradiation, respectively;

FIGS. 2A and 2B show a disc with a coated data area before and after irradiation, respectively;

FIGS. 3A and 3B show a disc clam-shell before and after irradiation, respectively;

FIGS. 4A-4C show an embodiment in which an RFID device is incorporated in a disc; and FIG. 5 shows a block diagram illustrating the vending of a disc constructed in accordance with this invention.

DETAILED DESCRIPTION OF THE INVENTION

The present invention provides various techniques to overcome the limitations of the existing art in the area of optical disc theft prevention by focusing on theft prevention methods that are manifested directly on the disc itself. More particularly, in accordance with this invention, a portion of an optical disc is coated with a material that changes its optical characteristics, preferably permanently, when exposed to electromagnetic radiation at a particular frequency.

In general, radiochromic materials rely on a radiochemical process to impart a change in the optical absorbance of the material in response to radiation of specific wavelengths. The materials can be made of thin plastic films impregnated with radiation sensitive chemicals or radiochromic dyes. Such films can only be activated once because the change in their optical characteristics is permanent. After they have changed state (either from transparent to absorbent (absorbent or opaque, or absorbent to transparent) the process cannot be reversed. Radiation sensitive materials (including radiochromic materials) are available that change from transparent to absorbent/opaque, or vice versa, that change from being opaque/absorbent to transparent.

As illustrated below, the present invention can be constructed using either type of material.

1. Transparent to Absorbent/Opaque Disc Coatings

In one embodiment of the invention, a disc 10 (shown in FIGS. 1A and 1B) is formed with two lead-in areas 12 and 14 disposed concentrically about a hub 16. Lead-in area 12 contains encoded data which prohibits the reading and/or writing of the disc 10. Area 12 is coated with a radiation sensitive material that is initially transparent. Lead-in area 14 contains standard lead-in data. The remainder of the disc holds content data. If the disc 10 in this format is inserted into an optical device, the device will not be able to read or write on the disc because of the data on lead-in area 12.

At a certain time, disc 10 is irradiated with waves of a particular wavelength from an external source (alpha, gamma, x-ray, n-ray, UV, IR etc.), as a result of which the lead-in area 12 becomes opaque, or absorbent (it becomes colored) as shown in FIG. 1B. See PCT publication no. 0079228 (application no. PCT/US00/16618). As a result, the disabling coding on lead-in area 12 can no longer be read by the conventional device. In other words, after irradiation, the disc 10 appears normal to any device since the disabling data on the disc is masked.

The layer or coating can comprise a class of chemicals referred to as L-alanines, a known family of chemicals that can be applied in a transparent layering or coating and then can become visible when exposed to a predetermined level of ionizing radiation, such as described in European Patent Publication EP1416294 (application no. 03078302.1). Alternatively, the layer or coating can comprise an ink which responds to ionizing radiation by changing color—such as those inks available from UV Process Supply, Inc. of Chicago, Ill. As a further alternative, the layering or coating could consist of F-centers, which change color based on optical transitions in the visible portion of the spectrum when exposed to ionizing radiation due to microscopic defect centers produced in the crystalline lattice of solid state materials. In another alternative, encapsulated color agents or dyes are embedded via micro encapsulation in a polymeric material which is applied to the disc as a layer or coating, as described in U.S. Pat. No. 4,918,317. The capsules are then burst by application of ionizing radiation thereby coloring a portion of the disc. In yet another alternative, the layer or coating can be created by electrochromic glazing as described in Cronin, et al., *Electochromic Glazing, Materials Research*, Vol. 2, No. 1, 1-9 (1999). In still yet another alternative, radiochromic dosimetry films may be employed, such as models HS, HD-810 and MD-55 offered under the trade name "Gafchromic."

Layering and coating can be accomplished as described in PCT Patent Publication 02075733 (application no. PCT/US02/05050) published Sep. 26, 2002.

In another embodiment, also generally illustrated by FIGS. 1A and 1B, the lead-in area 12 contains a digital trigger code, such as described in U.S. Pat. Nos. 5,253,275 and 5,315,448, which, upon being detected by the player, instructs the player not to play the disc. Upon exposure of the disc to the appropriate radiation, the radiation sensitive material layered or coated on the disc becomes colored or turns opaque. This masks the digital trigger code and because such digital trigger code is not read by the device, the disc is played.

B. Opaque to Transparent Disc Coatings

In another embodiment of the invention, a portion of the readable area of the optical disc—either in the lead-in or data area—is coated with or layered with a radiation sensitive material which is initially opaque or darkly colored, such as those described above (L-alanines, bleachable inks, encapsulated color agents, bleachable dyes, polycarbonates). The use of calorimetric dosimeters that change from color to colorless upon exposure to x-ray or gamma radiation has long been known, and are described in early publications such as U.S. Pat. No. 3,073,955, entitled "Gamma Radiation Dosimeter," the disclosure of which is incorporated by reference. Other materials that can be used to similar effect include photochromic switches formed from photochromic molecules, non-silver direct positive bleach out dyes as described in U.S. Pat. No. 3,595,655, eosin dyed poly-vinyl-butyral (PVB) films as described in Beshir et al., "Eosin Dyed Poly (Vinyl Butyral) Films for High-Does Radiation Dosimetry," *Int'l Journal of Polymeric Materials*, Vol. 52, No. 6, pp. 485-498 (June 2003) and bengal dyed poly-vinyl-alcohol as described in Abdel-Fattah et al., "Thin Film Dosimeters Based on Rose Bengal Dyed Poly (Vinyl Alcohol)," *Int'l Journal of Polymeric Materials*, Vol. 51, No. 5, pp. 413-427 (May 2002), all of which are incorporated by reference. These opaque or darkly colored areas of the disc interfere with the playing of the disc by decreasing the reflectivity of the metallized data layer of the disc, which prevents the disc player from properly reading the data underneath the opaque or darkly colored areas. Therefore, if such a disc is stolen from a retail establishment in its unaltered state, it cannot be successfully played and therefore the coating or layering of the disc with such materials acts as an effective theft deterrent device.

In one embodiment, a portion of the lead-in area necessary to the playing of the disc is layered with a material that interferes with the reading if the disc by the laser in the player device. Upon exposure to radiation of a certain type and wavelength the radiation sensitive material turns from opaque or absorbent to transparent or non-absorbent and unmasks the area of the lead-in area thereby enabling the playing of the disc by the disc player. For example, initially a disc may have its normal lead in area covered so that it cannot be used by a standard player. However, once the disc is irradiated, its lead-in area becomes visible and the disc appears like a normal disc to any device.

In another embodiment, a portion of the data area of the disc is layered with a material that interferes with the reading if the disc by the laser in the player device. In such a disc a portion of the data may be readable by the player, but not all. For example, in a DVD disc containing a motion picture, a portion of the motion picture would not be viewable thereby making the disc unattractive to thieves. However, upon exposure of the disc to radiation of a certain type and wavelength the radiation sensitive opaque or absorbent material turns transparent, non-absorbent or at least sufficiently transmissive to enable sufficient reflection of the laser and thereby unmasks the data area of the disc enabling the playing of the entire disc by the disc player.

This concept is illustrated in FIGS. 2A and 2B. Disc 20 includes one or more theft control areas, such as 22 and 24 disposed on a zone of the disc that is normally occupied by content data. Before irradiation, the areas 22, 24 render the disc 20 substantially worthless because a number of data tracks are unreadable. However, after irradiation, the coloration or opaqueness substantially disappears thereby rendering the disc completely readable.

For all these embodiments, those who legitimately purchase the disc, the opaque or darkly colored areas on the disc can be eliminated prior to the customer leaving the retail establishment, but without the necessity of removing the disc from the packaging. The disc, while still in its package, can be exposed to radiation of a certain specific type and wavelength (such as the gamma, alpha, x-ray or other radiations described above and in the articles and publications incorporated by reference herein) whereby upon such exposure the opaque or darkly colored area becomes transparent, nearly transparent or sufficiently reflective and thereby the underlying data becomes readable by the conventional laser device.

Unlike many antitheft devices which can be easily overcome by the thief once the product has left the establishment, devices that will properly irradiate the radiation sensitive coatings or layers as described herein are not readily available to consumers, and even if such devices could be accessed, they may not be effective unless the appropriate settings are known. Therefore, as a practical matter, unless the disc is irradiated with the proper device and at the appropriate wavelength and intensity prior to leaving the retail establishment, it will not be playable.

Retail Authorization Indicia

In connection with the invention disclosed herein, it may also be useful to include indicia on either the packaging of the disc, or on the disc itself that is visible through the packaging, indicating whether the disc has been irradiated such that it is playable. Providing such indicia could inhibit stolen goods entering unauthorized distribution channels and being purchased by consumers unwary of the fact that the discs remain in their disabled state. The indicia would need to be readily apparent from a casual observation of the packaging so that the consumer would know that an "authorized" product is being purchased.

One approach to incorporating such indicia in optical disc packaging is to place a radiation sensitive marker, which could be a sticker, a stamp, or any variety of thin, lightweight materials that are capable of carrying or being impregnated with radiation sensitive material, on the exterior of the disc case, but within the shrink-wrap packaging that is typically employed. Another approach would be to place such radiation sensitive marker within the insert portion on the exterior of the disc case (such as is typical with DVD "clamshell" cases). Another approach would be to place such radiation sensitive marker beneath the clear plastic of a typical jewel case, but above any package insert and therefore visible. Yet another approach, in the case of opaque disc cases, would be to position the radiation sensitive marker beneath a transparent window either cut or integrated into the case, whereby the radiation sensitive marker would be clearly visible. Still yet another approach would be to integrate the radiation sensitive marker into the insert material or packaging.

This aspect of the invention is illustrated in FIGS. 3A and 3B. As shown, a typical opaque "clamshell" case 30 has a "window 32" in the rear portion of the case—created either by cutting a hole in the case or by integrating transparent material into the case. Underneath the window is a radiation sensitive marker consisting of a sticker in the form of a star 34 or any other image. As noted above, the star could be made of paper, plastic or any other material that can bear, carry or be impregnated with radiation sensitive material. In FIG. 3A the star is shown in a first state indicating that the package has not been irradiated. In FIG. 3B star 34B is shown as it appears after irradiation. Star 34B is shown in a second state in FIG. 3B—with visible dots on its surface—indicating that the package has been irradiated. The dots shown on the star are areas in which the star material either bears or has been impregnated with radiation sensitive material.

The radiation marker can be constructed as taught in European Patent Publication EP1416294 (application no. 03078302.1), the disclosure of which is incorporated by reference.

Ideally, the radiation sensitive material on the marker will be selected such that it will react in the same manner as the radiation sensitive material on the disc and as such will accurately identify whether the disc has been irradiated such that it will be playable. For example, if the disc is layered or coated with a radiochromic dye the will bleach or color in the presence of certain wavelengths and intensity of gamma radiation, the radiation sensitive marker should be impregnated with or bear a material that will also respond, whether by coloring or bleaching, in the presence of those same wavelengths and intensity of gamma radiation. While one might achieve this using, for example, the same radiochromatic dye to both place on the disc and the marker, this is not essential so long as the materials respond in the same way to the applied radiation.

In one embodiment, irreversible thermochromic inks are used to selectively cover and uncover portions of a disc, such as the portion indicated in FIGS. 1A and 1B. For example, an ink may be used that is opaque at temperatures below a threshold T1 and becomes transparent above T1. In another example, an ink is used to is transparent below temperature T1 and opaque above T1. In another example, a pattern is formed on the disc that is formed of two inks: one ink being opaque below T1 and transparent above T1, and the second ink being transparent below T2 and opaque above T2, with T2 being larger then T1. Then the disc, or the portion of the disc covered by the inks is heated at the point of sale to a temperature between T1 and T2, thereby rendering the pattern formed by the inks transparent. The band of temperature T1 and T2 can be made relatively narrow and can be kept a secret so that it would be difficult for unauthorized persons to find this bend. Inks with different characteristics may also be used so that the pattern on a disc is opaque when heated to a temperature between T1 and T2 and transparent above T2 or below T1. Again, it must be emphasized that the inks change their properties irreversibly once heated to the specified temperatures.

For these latter embodiments, a small oven or other heating means is provided at the point of sale. In one embodiment, an electric or electromagnetic heater is used to heat either the whole disc, but preferably, only a small portion of the disc with the special inks described above is heated. In one embodiment, the ink pattern is covered by an antenna. Radio waves or microwaves are then directed at the pattern externally causing the pattern to be heated to the desired temperature. These waves are preferably shaped into a geometric pattern selected to minimize to time required to heat the disc, while at the same time insuring that all the selected portion of the disc corresponding to the ink pattern is heated. For example, the disc may be heated by waves having a ring- or toroidal-shape as illustrated in FIGS. 1A and 1B.

In yet another embodiment, instead of, or in addition to inks having the specific characteristics mentioned above, a portion of the disc is heated to a temperature sufficient to distort a specific region on the disc thereby making a data section unreadable.

Another embodiment of the invention is shown in FIGS. 4A-4C. In this embodiment, other elements are formed on the disc and these elements are then selectively enabled or disabled by the application of an appropriate radiation from an external source. For example, FIG. 4A shows a disc 40 with an RFID (Radio Frequency Identification) device 42. In one embodiment of the invention, the RFID device 42 is used as a standard device of this type that when queried, it either outputs an analog rf signal or a digital signal. Alternatively, the RIFD device 42 may be used to selectively activate a highly reflective coating on the disc as described in U.S. Published Patent Application 20040054594 incorporated herein by reference.

Importantly, an element or portion of the RFID device 42 is made of a material that is radiation sensitive and that changes its electrical characteristics in response to radiation of a particular wavelength. The material may be one of the materials discussed above that also has the required electrical properties, or other similar materials well known in the art. For example, in one embodiment of the invention, the disc 40 is made so that the radiation sensitive element is inoperational. Then when the disc 40 is subjected to radiation, the element becomes operational thereby allowing the RFID device to function.

However, in a preferred embodiment, the disc 40 is made so that the radiation sensitive element of the RFID 42 is operational and is rendered inoperational by radiation. FIGS. 4B and 4C show some examples of these embodiments. In FIG. 4B device 42 includes an RFID circuit connected to an antenna 48 by a wire 48. The antenna 46 and/or the wire 48 can be made of the radiation sensitive material. Therefore when radiation is applied to the disc 40, portions of the antenna 46 become highly resistive to the point were the antenna 46 is unable to transmit or receive any RF signals. Similarly the resistance of the wire 48 rises to a high level in response to radiation to the point where no signals of suitable amplitude are exchanged between the antenna 46 and circuit 44.

Alternatively, FIG. 4C shows a tank circuit used in the RFID for tuning or other similar purposes. The tank circuit generates a signal at frequency determined by the values of inductor of 45 and the capacitor 47. In the present invention, application of radiation changes the value of either inductor 45 or capacitor 47 (or both) and therefore the RFID device does not work. Alternatively, the resistance of conductor 49 is increased to a very high level thereby in effect disconnecting the tank circuit from the rest of the circuit 44.

FIG. 5 shows a typical process utilizing the subject invention. A disc 50 having the characteristics of any of the discs described above is purchased in a store. At this stage the disc 50 is not playable. At the check out counter, or at any other designated place, the disc is subjected to radiation from source 52. Once the disc is irradiated, it can be taken home or any other place and inserted into a device 54 so that it can be played, recorded, etc. If the disc 50 is removed without irradiation, and placed into the device 54, it will not be playable.

Obviously numerous modifications may be made to the invention without departing from its scope as defined in the appended claims.

We claim:

1. An optical disc used for data storage comprising:
 a disc body having two opposed surfaces;
 a standard data storage area disposed on at least one of said surfaces and being readable by an optical data handling device; and
 a theft control area formed on one of said surfaces, said theft control area being much smaller than said standard data storage area, said theft control area including:
 an RFID formed integrally on said one surface of said disk body as part of said theft control area, said RFID including an element having a first state and being sensitive to electromagnetic radiation in a predetermined frequency range to change to a second state, said RFID being operational and generating an output signal in response to a query only if said element is one of said first and second states and, said RFID being disabled and being unable to generate said output signal if said element is in said other of said first and second states, said element being configured to be permanently set into one of said respective states after a single application of said electromagnetic radiation,
 wherein said first element disables said RFID non-operational in said first state,
 wherein said RFID generates said output signal only when said element is in said first state and is permanently disabled from generating said output signal once said element is switched to said second state.

2. The optical disc of claim 1 wherein in response to said electromagnetic radiation, said element is permanently changed from said first to said second states.

3. The optical disc of claim 1 wherein said element has an electrical characteristic that is permanently changed in response to said radiation.

4. The optical disc of claim 3 wherein said electrical characteristic is one of resistance, inductance and capacitance.

5. The optical disc of claim 1 wherein said radiation is selected from one of alpha, gamma, x-ray, n-ray, UV and IR type radiation.

6. The optical disc of claim 1 wherein said RFID generates said output signal only when said element is in said second state.

7. The optical disc of claim 1 wherein said RFID is imbedded in said disc body.

8. An optical disc for storing digital content comprising:
 a hub with a lead-in area;
 a data storage area disposed around said lead in area and containing content; and
an RFID formed integrally on said optical disk as a security measure using a security on said disc that is significant, said RFID including an element with an element characteristic having a first value and being responsive to a radiation in a predetermined frequency range to change said characteristic to a second value, said RFID selectively generating an output signal only when said element characteristic has one of said first and second values, said RFID being disabled when said element characteristic has the other of said first and second values,
 wherein said first element disables said RFID non-operational in said first state,
 wherein said RFID generates said output signal only when said element is in said first state and is permanently disabled from generating said output signal once said element is switched to said second state.

9. The optical disc of claim 8 wherein said element is made of a radiochromatic material.

10. The optical disc of claim 9 wherein said material changes its electrical characteristics.

11. The optical disc of claim 10 wherein said material changes its resistance.

12. The optical disc of claim 10 wherein said material changes its inductance in response to said radiation.

13. The optical disc of claim 10 wherein said material changes its capacitance in response to said radiation.

14. The optical disc of claim 9 wherein said RFID includes an electronic circuit, an antenna and a connector connecting said antenna to said electronic circuit.

15. The optical disc of claim 14 wherein one of said antenna and said connector include said element.

16. The optical disc of claim 14 wherein said electronic circuit is a tank circuit formed of a capacitor and an inductor, said element being at least a part one of said capacitor and said inductor.

17. A package comprising:
an outer shell;
a media storing content in a digital format; and
a theft control element including an RFID device, said RFID including:
wherein said RFID includes an electronic circuit, an antenna and a connector connecting said antenna to said electronic circuit, one of said electronic circuit, said antenna and said connector including an element having a first mode, said element being permanently changed to a second mode in response to an external an electromagnetic radiation having a predetermined frequency, said RFID being adapted to generate an output signal in response to a query when said element is in said first mode; said RFID being disabled and is not generating said output signal in response to said query when element is permanently changed to said second mode,
wherein said first element disables said RFID non-operational in said first state,
wherein said RFID generates said output signal only when said element is in said first state and is permanently disabled from generating said output signal once said element is switched to said second state.

18. The package of claim 17 wherein said RFID is integral with said media.

19. The package of claim 17 wherein said external signal changes an electrical characteristic of said element.

20. The package of claim 19 wherein said element changes its resistance.

21. The package of claim 19 wherein said element changes its inductance.

22. The package of claim 19 wherein said element changes its capacitance.

* * * * *